United States Patent
Steinbock

(10) Patent No.: US 6,263,764 B1
(45) Date of Patent: Jul. 24, 2001

(54) JACKBOLTS FOR MULTI JACKBOLT TENSIONERS

(75) Inventor: Rolf H. Steinbock, Pittsburgh, PA (US)

(73) Assignee: Steinbock Machinery, Inc., Carnegie, PA (US)

( * ) Notice: Subject to any disclaimer, the term of this patent is extended or adjusted under 35 U.S.C. 154(b) by 0 days.

(21) Appl. No.: 09/546,879

(22) Filed: Apr. 10, 2000

Related U.S. Application Data

(60) Division of application No. 09/290,795, filed on Apr. 13, 1999, now Pat. No. 6,112,396, which is a continuation-in-part of application No. 09/095,233, filed on Jun. 10, 1998, now abandoned.

(51) Int. Cl.[7] .............................. B25B 17/00; B25B 29/02
(52) U.S. Cl. .................... 81/57.38; 29/452; 411/14.5; 411/916
(58) Field of Search .................. 29/452, 446, 456; 411/14.5, 917, 916, 393; 403/362; 81/57.38

(56) References Cited

U.S. PATENT DOCUMENTS

| | | | |
|---|---|---|---|
| 4,338,037 | * 7/1982 | Deminski | 403/24 |
| 4,846,614 | * 7/1989 | Steinbock | 411/307 |
| 4,927,305 | * 5/1990 | Peterson, Jr. | 403/362 |
| 5,069,587 | * 12/1991 | Levenstein | 29/456 |
| 5,075,950 | * 12/1991 | Steinbock | 29/446 |
| 6,199,453 | * 3/2001 | Steinbock | 29/452 |

* cited by examiner

Primary Examiner—S. Thomas Hughes
Assistant Examiner—Jermie E. Cozart
(74) Attorney, Agent, or Firm—Clifford A. Poff

(57) ABSTRACT

Jackbolts for multi jackbolt tensioner embody a thread construction which taper from a maximum diameter adjacent to torque receiving end of the jackbolt when threadedly engaged with a threaded opening in the outer peripheral part of a jackbolt body. The threads of the jackbolt have a different thread pitch than the threads in the jackbolt body and the tooth flank of the jackbolt threads for an angle with the tooth flanks of the thread in the jackbolt body. By this thread construction, there is formed a helical volume of ever increasing size along the jackbolts commencing at a metal to metal relation at the torque receiving end. Stressing of the jackbolt closes the helical volume bringing the threads to a metal to metal load transfer relation. The end of the jackbolts has a protruding central end portion that elastically flattens under stress to reduce torque requirements.

15 Claims, 6 Drawing Sheets

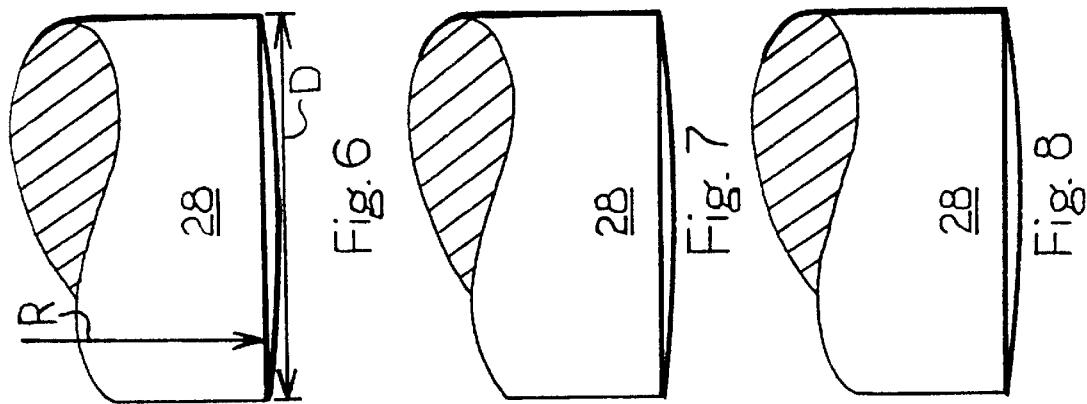
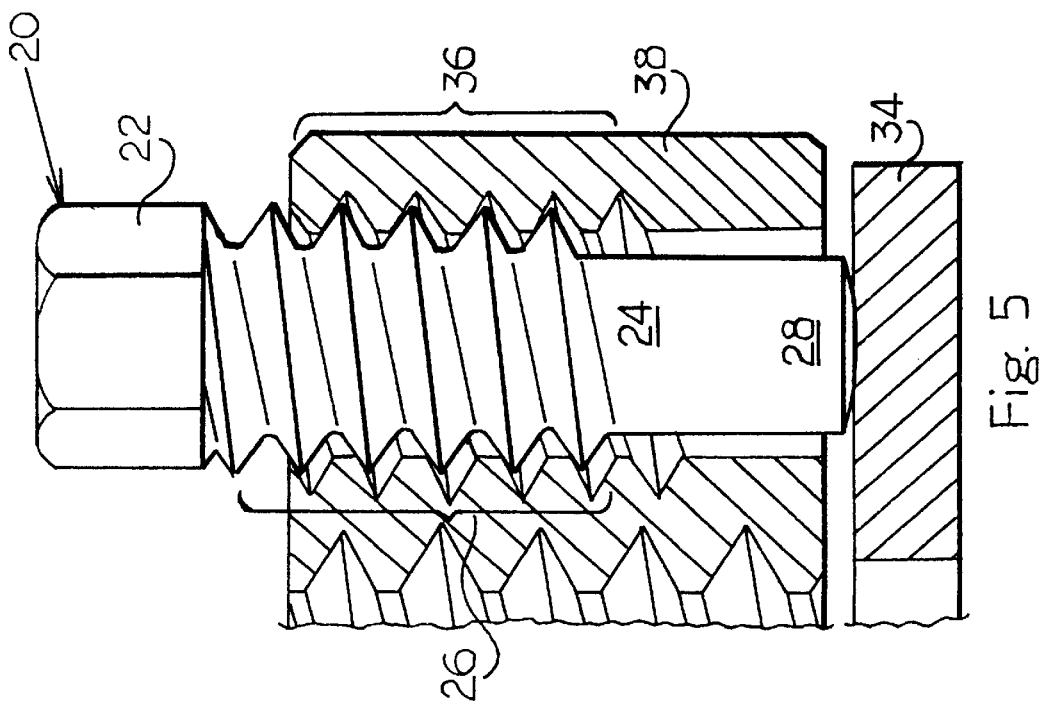

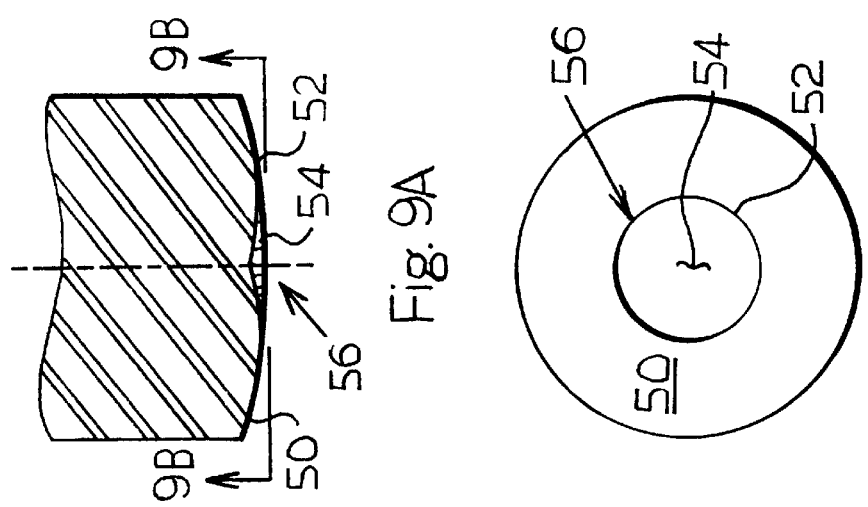
Fig. 10
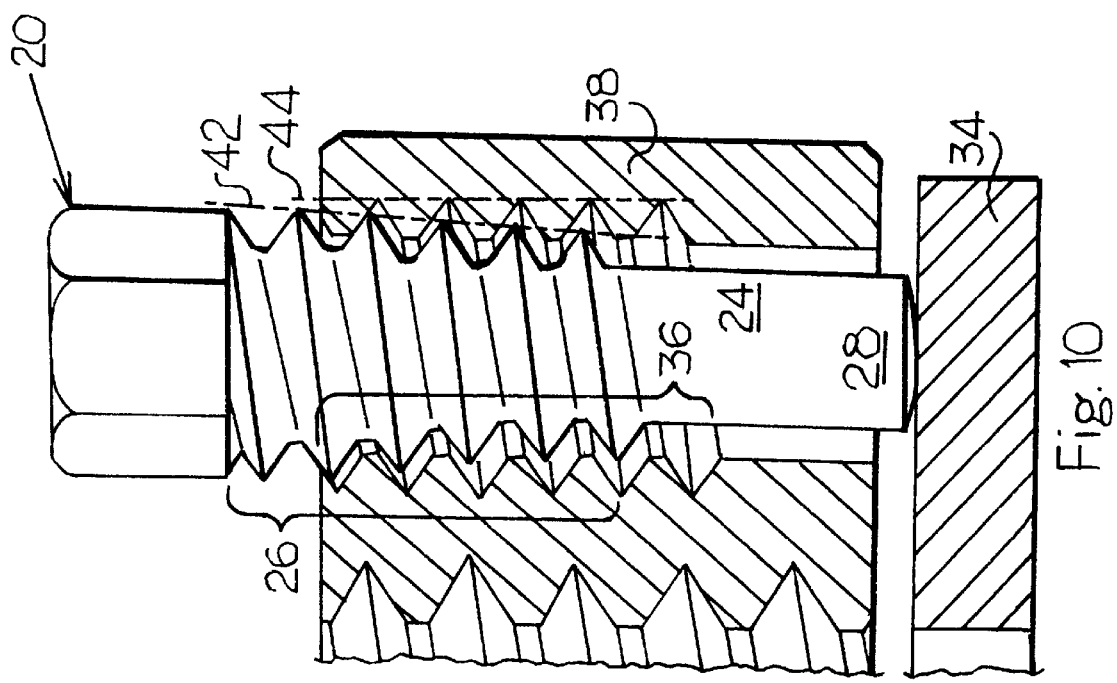
Fig. 9A
Fig. 9B

JACKBOLTS FOR MULTI JACKBOLT TENSIONERS

CROSS-REFERENCE TO RELATED APPLICATION

This application is a division of application Ser. No. 09/290,795, filed Apr. 13, 1999 now U.S. Pat. No. 6,112,396 which is a continuation-in-part of application Ser. No. 09/095,233, filed Jun. 10, 1998 now abandoned.

BACKGROUND OF THE INVENTION

1. Field of the Invention

The present invention relates to multi jackbolt tensioners and an apparatus for producing such tensioners to improve the performance under very high compressed stresses and, more particularly to the construction of jackbolt used in such tensioners including an improved thread configuration for the jackbolts and mating threads for a stress generator component.

2. Description of the Prior Art

The present invention relates to improvements to the fastener disclosed in RE33,490 which is illustrated in FIG. 1 for use to clamp flanges 1 and 2 under a compressor force indicated by arrows 3 which is maintained by stress indicated by arrow 4 of a shank portion 5 adjoined with a fastener head 6 at one end and a tensioner body 7 threadedly engaged with the shank portion opposite the fastener head 6. Torque applied to jackbolts 8 threadedly engaged about the periphery of the tensioner body 7, develop a very high thrust force against a hardened washer 9. This thrust force and the opposite reaction force on fastener head 6 create a strong clamping force on the flanges. The jackbolts are subject to very high compressive stresses. Compressive stresses in excess of 200,000 psi are routinely permitted for some materials. Compressive stresses do not usually lead to failure in service, however very high torque must be applied to the jackbolts to obtain the high stresses. One way to keep the torque requirements relatively low is by the use of a suitable lubrication. Several lubricants such as graphite oil paste, are suitable to lower the torque requirement sufficiently to prevent the jackbolts from shearing.

In low temperature service the torque required to loosen the jackbolts is about the same as the torque required to tighten the jackbolts but, problems are experienced. When multi jackbolt tensioners are heated beyond the breakdown point of the oil in the graphite oil paste, the friction factor of the lubrication increases by 300 to 400%. Some synthetic oils are stable up to 400° F. but above that temperature synthetic lubricates generally fail. Solids added to proprietary lubrication compounds generally fail as a lubricant above 500 to 600° F.

Seizure of the jackbolt threads in the tensioner body, and jackbolts can shear under the torque required to loosen the jackbolts. A graphite lubrication compound can be reestablished by introducing a penetrating oil to penetrate along the jackbolt threads and across the compressively stressed ends of the jackbolts. Applying oil at an elevated temperature reduces the viscosity of the oil and facilitates penetration along the mating threads.

FIG. 2 illustrates a multi jackbolt tensioner where the known thread design for the mating threads of the jackbolts and the tensioner body are configured according to standard thread specifications. The jackbolts are illustrated in the state before preloading and the mating threads are in continuous contact along the length of mating engagement. The end of the jackbolt contacting the washer 9 is provided with a flat face. When the jackbolt is torqued sufficiently to establish high stress loads in the fastener, the jackbolt threads, as shown in FIG. 3, deform and upset the metal of the thread in the tensioner body 7. The thread deformation while dependent on the relative strength of the materials of the jackbolt and the tensioner body 7 have been found to generally extend sufficient convolutions identified by reference numeral 10 to a point identified by reference numeral 11 where succeeding convolutions function to transfer stress without deformation. The thread deformation causes a significant increase to the torque that must be supplied to the jackbolts in order to attain the desired clamping force which the fastener is to produce. The thread deformation also strips the deformed lower threads of lubricant which also contributes to a requirement for greater torque. It has also been found that inaccuracy in tooling used to form the mating threads produce a corresponding inaccuracy as to the site of mating engagement such as interiorly or exteriorly of the pitch diameter. When threads contact with the jackbolt threads occurs outside the pitch diameter, greater torque is necessary than when the threads bear inside the pitch diameter. In the highly stressed state the end of the jackbolt in contact with the washer 9 has been found to experience fretting which is a form of cold welding generally at the outer peripheral rim of the face surface of the jackbolt. The occurrence of fretting will occur even in the presence of lubrication when the high pressure requirements cause the lubrication compound to be hydraulically expelled from the area of mating engagement between the jackbolt and the washer.

It is an object of the invention to provide a multi jackbolt tensioner design and method for producing the same to achieve an efficient stress distribution in the mating threads of the jackbolts and the tensioner body to prevent local yielding in the lower threads which are most remote from the torque receiving ends of the jackbolts and to improve oil penetration for lowering the magnitude of torque required to stress the jackbolts for operation of the tensioner.

It is a further object of the present invention to provide a construction and arrangement of parts for a multi jackbolt tensioner to reduce the torque requirements of the jackbolts to generate a given load and to reduce the breakaway torque requirements particularly when releasing a multi jackbolt tensioner after exposure to a high temperature environment.

SUMMARY OF THE INVENTION

A multi jackbolt tensioner including a jackbolt body having a plurality of holes spaced uniformly from a longitudinal central axis at spaced apart locations about an outer periphery thereof, the holes having sidewalls formed with body threads and jackbolts each including a torque receiving end adjacent a jackbolt body having jackbolt threads to threadedly engage the body threads in one of the holes in the jackbolt body, the jackbolt threads and the body threads being constructed to form a helical gap commencing at a place of metal to metal threaded contact proximate the torque receiving end and terminating remotely thereto along the length of the jackbolt, the helical gap being defined by an ever increasing transverse volume to elastically produce metal to metal thread contact in a load transferring relation along the length of the threads with ever increasing thread stress in response to torque applied to the torque receiving end of the jackbolt.

BRIEF DESCRIPTION OF THE DRAWINGS

The present invention will be more fully understood when the following description is read in light of the accompanying drawings in which:

FIG. 5 is an elevational view of the embodiment shown in FIG. 4 after torque is applied to the jackbolts to a desired magnitude;

FIGS. 6, 7 and 8 are alternative embodiments to the configuration of the end face of a jackbolt for contact with a washer;

FIG. 9A is a sectional view of a further alternative embodiment of an end portion of a jackbolt for contact with washer;

FIG. 9B is a view taken along lines 9B—9B of FIG. 9A;

FIG. 10 is a view similar to FIG. 4 and illustrating the tapered thread configuration on the jackbolts;

DETAILED DESCRIPTION OF THE DRAWINGS

Figure 2:
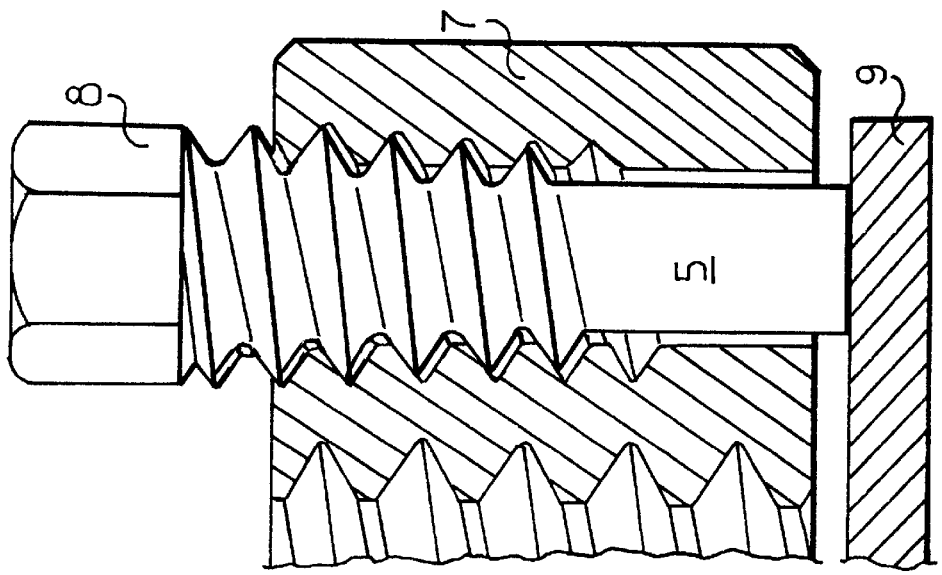
FIG. 2 is an elevational view in section illustrating the jackbolt threadedly engaged with a threaded opening in a tensioner body before applying torque to the jackbolt.
Figure 1:
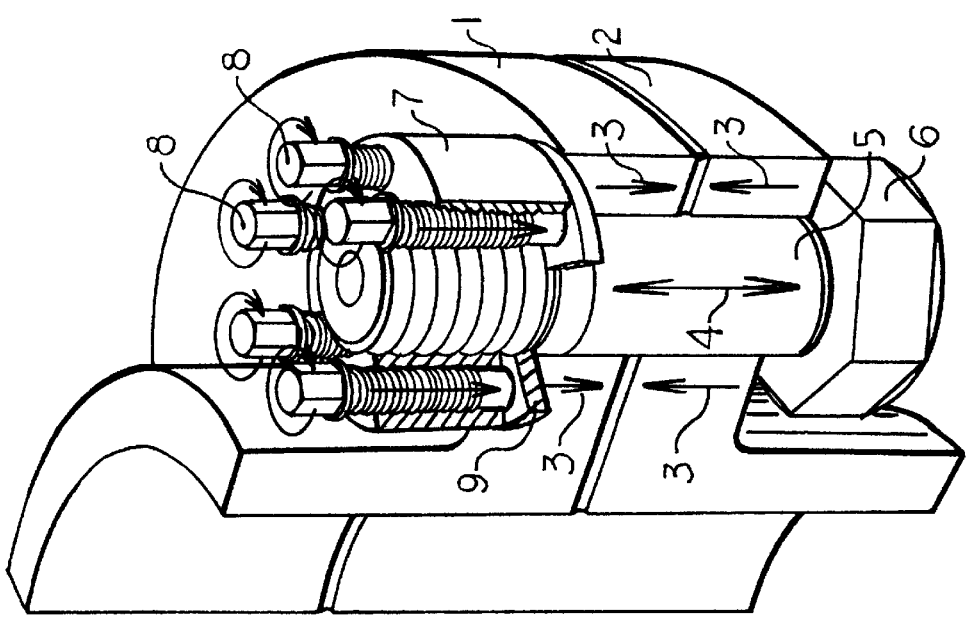
FIG. 1 is an isometric view illustrating a multi jackbolt tensioner of the type known in the art and illustrated in patent RE 33,490.
Figure 4:
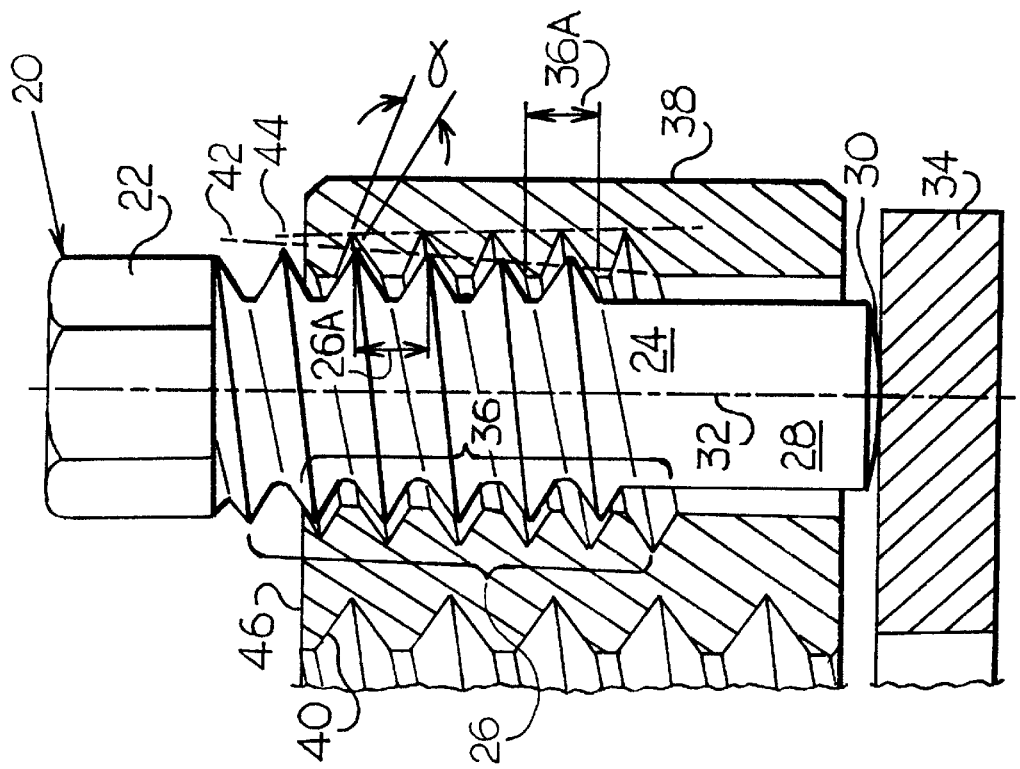
FIG. 4 is an elevational view in section of a preferred embodiment of a jackbolt and thread configuration in the tensioner body before applying torque to the jackbolt.
Figure 3:
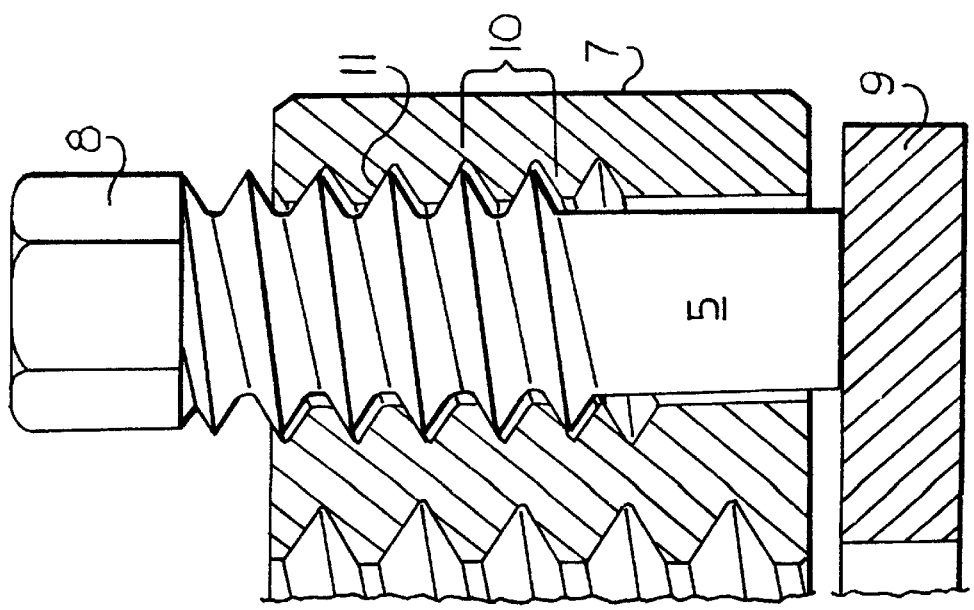
FIG. 3 is an elevational view in section similar to FIG. 2 and illustrating thread deformation after applying high torque to the jackbolt.

According to the preferred embodiment of the present invention as shown in FIG. 4 there is shown a jackbolt 20 having a torque receiving end 22 with flatted surfaces arranged to form a hexagon configuration per se well known in the art. Beyond the torque receiving end there is a jackbolt body 24 having a threaded portion 26 terminating at an end portion 28 having an end face 30 formed with a protruding central area along a longitudinal central axis 32 of the jackbolt. End face 30 is brought into contact with a washer 34 by rotating the jackbolt to advance the shank portion along internal threads 36 formed in a opening extending through an outer peripheral part of a jackbolt body 38. The jackbolt body has a central threaded opening 40 for mating engagement of threads on an end portion on a bolt or stud in a manner per se known in the art and as shown in FIG. 1. It is to be understood that the embodiment of FIG. 4 illustrated one jackbolt of a plurality of such jackbolts that are identically constructed and threadedly engaged with the threads of opening spaced about the outer peripheral part of the jackbolt body in a manner which is typically depicted in FIG. 1.

According to the present invention the threaded portion 26 of each jackbolt is constructed with tapered threads which diminish in diameter with a maximn diameter located adjacent torque receiving end of the jackbolt and a minimum diameter located where the threads of the threaded portion terminate. The tapered nature of the threads can be seen in FIG. 4 by comparing construction line 42 with a construction line 44 joining the root of each thread convolution comprising internal threads 36 in the jackbolt body. The present invention in the preferred form further provides dissimilar thread pitches between threaded portions 26 and internal threads 36. The threads comprising the threaded portion 26 have a thread pitch 26A which is greater than the thread pitch 36A than the thread pitch of threads 36. Additionally the preferred embodiment of the present invention provides a thread construction characterized by a flank angle between the radially extending flank of threads forming threaded portion 26 and the radially extending flank of the threads forming internal threads 36. The different flank angles shown in FIG. 4 is identified by . The flank angle relationship provides that the crest portion of the threads comprising internal threads 36 will contact the flank portion of the threads comprising threaded portion 26 at a point on a diameter that is less than the pitch diameter of the jackbolt threaded portions. This relationship produces the advantageous effect of reducing the moment arm for torque applied to the torque receiving end 22 and thereby reducing the torque requirement for stressing the multi jackbolt tensioner. The construction and relation between the threads comprising threaded portion 26 and internal threads 36 forms a helical gap commencing at a point 46 of metal to metal contact between mating threads which is adjacent the torque receiving end 22 and increasing in volume transversely of the jackbolt threads. The helical configuration with the ever increasing transverse volume is attributed collectively and individually to the tapering threads of the jackbolt threaded portion, the differential to the thread pitches of between threaded portion 26 and internal threads 36 and the different flank angle .

After the multi jackbolt tensioner is stressed to the desired extent, the relationship of the jackbolt 20 to the jackbolt body is illustrated in FIG. 5. The loading of the jackbolt serves to establish metal to metal contact and a mating relation between threads of threaded portion 26 and internal threads 36 thus eliminating the helical gap with the ever increasing volume. The relationship between the mating threads advantageously brings all threads to bear evenly on a small friction diameter which serves to reduce the magnitude of torque required to stress the tensioner to its desired level. Torquing of the jackbolt for stressing of the tensioner flattens the protruding portions of end face 30 within the elastic limits of the jackbolt material as well as the elastic shortening of the threads which produce the metal to metal contact.

The compressibly stressable end 30 of the jackbolt is spherical and as shown in FIGS. 5 and 6 is defined by a spherical radius R of between 6 and 20 times the diameter D of the jackbolt preferably of the order of 10 times the jackbolt diameter. The size of the radius R can vary in a fashion dependent on the elastic characteristics of the jackbolts which include the elastic properties and the design so as to assure that the elastic region of the central area occurs to increase the load transfer area but without incurring fretting. depending on the hardness of the jackbolt and the hardness of the opposing hardened washer, as well as the size of the load. A sphere can be readily produced and the spherical surface traversed by the longitudinal axis it axis will touch only under a no-load condition and, after loading, the spherical surface elastically deforms to substantially planar. A small dimple may elastically form in the hardened washer as the sphere elastically. When the stress is relaxed on the multi jackbolt tensioner, the washer and the end surface of the jack bolt will return to their original configuration.

The shape of the jackbolt end can also be parabolic as shown in FIG. 7 or the shape can take the form of a shallow cone as shown in FIG. 8. A shallow cone can be readily produced and after loading, the point of the cone will yield resulting in a near spherical shape. Other configurations to the end face of the jackbolts can be utilized based on a calculated elastic flatten to produce the required compressibly stressable end to the jackbolt.

A further alternative to the shape of the compression end face of the jackbolt is the form of two truncated concentric conical surfaces merging at a common diameter spaced by a radial distance from the longitudinal axis of the jackbolt. In FIGS. 9A and 9B, the jackbolt compression end face is made up of an outer truncated conical surface 48 commencing at the outer periphery of the jackbolt end portion 50 and angling outwardly forming a protrusion extending to a juncture circle 52. An inner truncated conical surface 54 commences at the juncture circle 52 and angles inwardly forming a cavity in the end face of the jackbolt. The juncture circle 52 forms an annular ridge which may undergo a slight elastic flatting but not to such an extend so as to eliminate or drastically reduce the volume of a lubricant reservoir 56 defined and bounded by the inner truncated conical surface 54 and a load transfer face surface of a hardened washer when the annular ridge at the juncture circle 52 is in the force transmitting relation with the hardened washer. It is intended a lubricant will be entrapped in the lubricant reservoir 56 when the jackbolt is torqued and remains useful and available as a lubricant for removal of the jackbolt at a later time. To minimize flattening of the annular ridge occurring at the juncture circle 52, the angling of the truncated conical surfaces 48 and 54 relative to a perpendicular plane to the central longitudinal axis of the jackbolt are at shallow angles of between 1° and 10°. The chosen angles may differ one from the other. The selected angles are to be chosen to control elastic flattening based on the material properties of the bolt metal, torque requirements and operating temperatures.

As explained hereinbefore, the threaded portion 26 of the jackbolts are tapered as shown in FIG. 5. The tapered configuration produces a metal to metal contact at point 46 under a no load condition and proceeding along the threaded portion there is an ever increasing helical volume between the confronting thread flanks until this volume is eliminated by stressing of the jackbolt. Unlike conventional mating threads, loading of the jackbolts proceeds from an initial load transfer site at point 46 and then proceeds by a progressive closing of the helical volume as additional thread contact is made and provides the needed increase to the capacity for load transfer.

Figure 11:
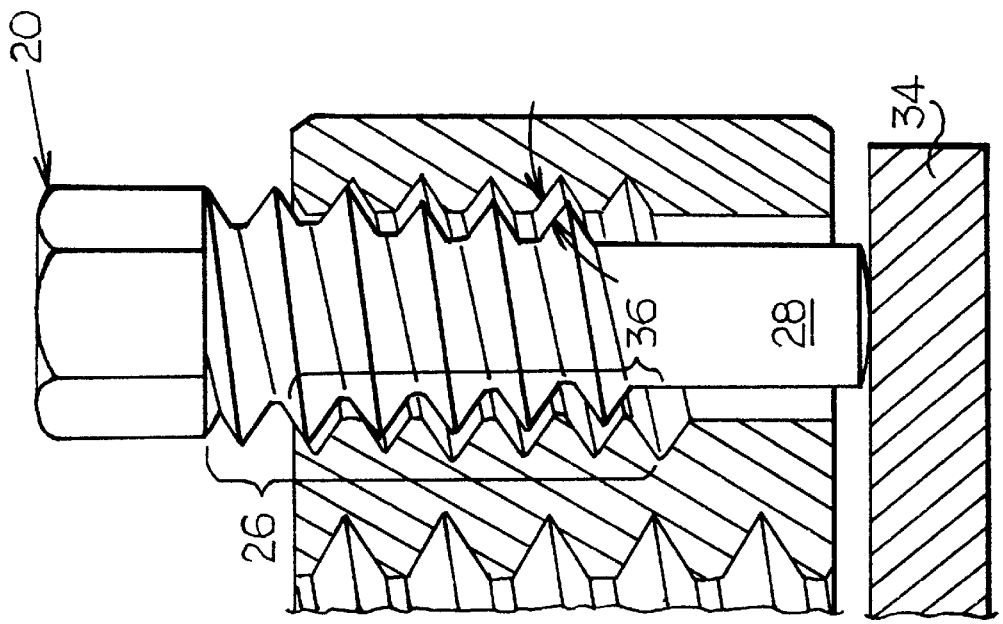
FIG. 11 is a view similar to FIG. 4 and illustrating the differential thread pitch between the threads of a jackbolt and threads in the tensioner body.
Figure 12:
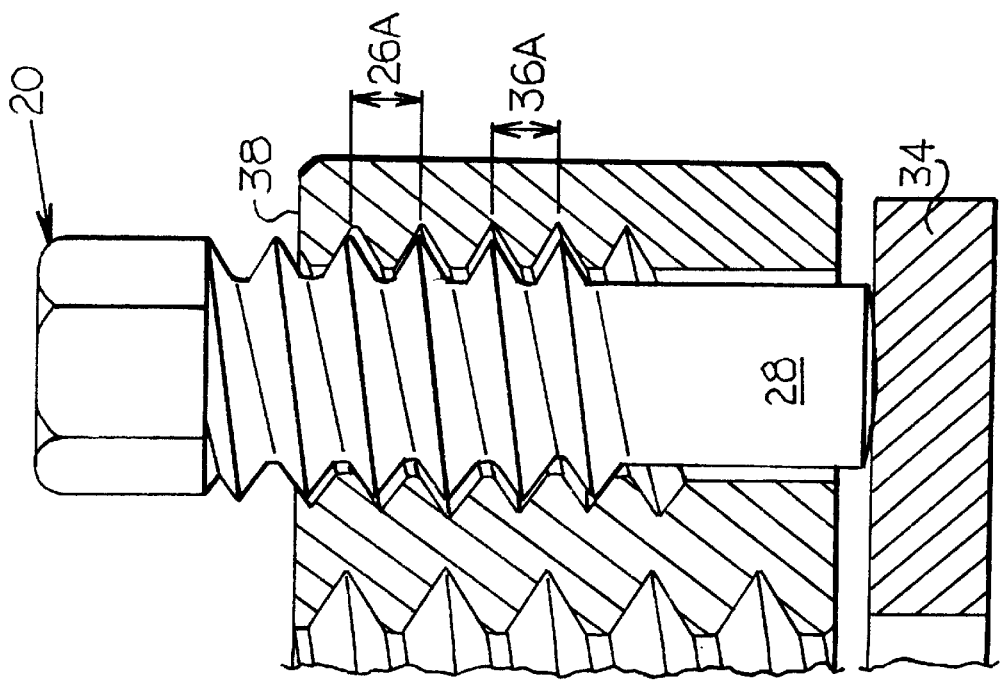
FIG. 12 is the combination of tapering jackbolt threads and differential thread pitches in an unstressed state of the jackbolt.

The differential thread pitches 26A and 36A as described hereinbefore, and as shown in FIG. 10 also create a helical gap of ever increasing volume commencing at point 46 and extending toward the compressible stressable end. Loading of the jackbolts proceed from an initial load transfer site at point 46 and then proceeds by a progressive closing of the helical volume as additional thread contact is made and provides the needed increase to the capacity for load transfer. The combination of tapering threads and differential thread pitches is depicted by FIG. 11 where it can be seen that the combination produces a rapidly increasing helical volume as compared with the helical volume depicted in FIG. 9 for a tapered thread only and FIG. 10 for a differential thread. When the jackbolt is torqued to the desired level, the combination of tapered threads and extended thread pitch produces as illustrated in FIG. 12 a most desirable uniform load bearing contact between the mating threads.

Figure 13:
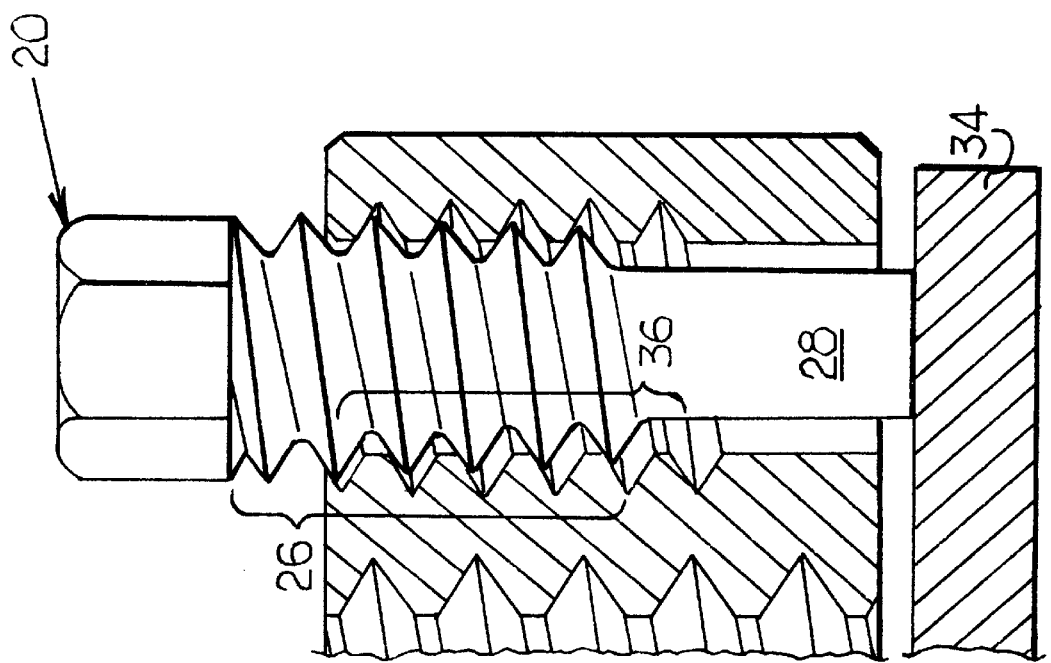
FIG. 13 is the combination of tapering jackbolt threads and differential thread pitches in an stressed state of the jackbolt.
Figure 14:
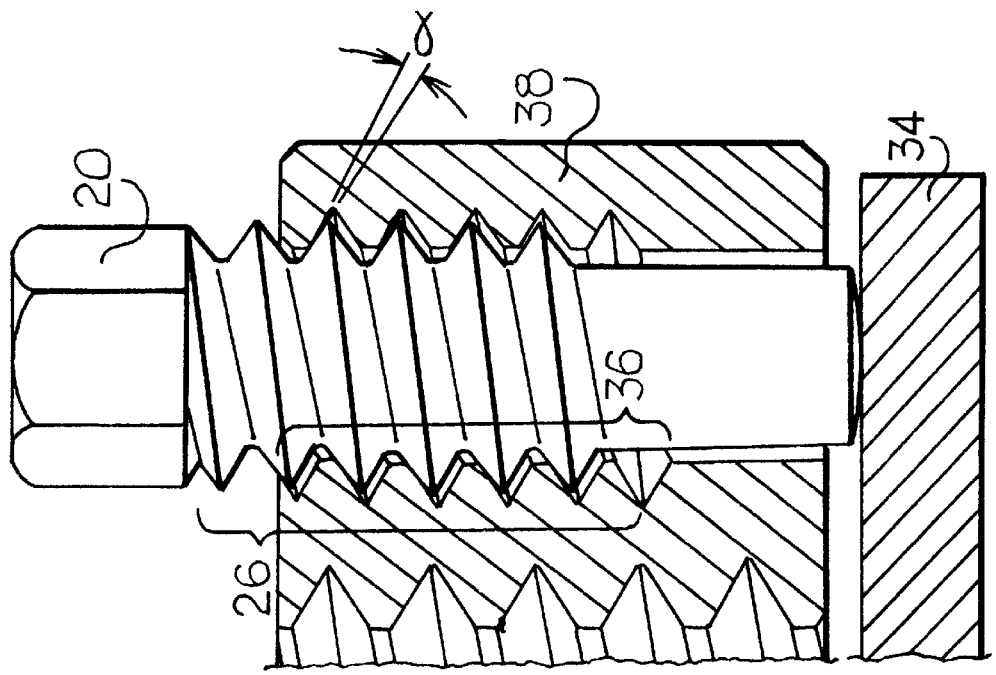
FIG. 14 illustrates the angled relation between tooth flanks of the jackbolts and threads of the tensioner body.

By creating an angled relation between the tooth flanks, it can be seen from FIG. 13 that the mating contact between the thread flange is reduced, thus reducing the torque requirements for a given preload.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any singe embodiment, but rather construed in breadth and scope in accordance with the recitation of the appended claims.

What is claimed is:

1. A multi jackbolt tensioner including:
   a jackbolt body having a plurality of holes spaced uniformly from a longitudinal central axis at spaced apart locations about an outer periphery thereof, said holes having sidewalls formed with body threads; and
   jackbolts each including a torque receiving end adjacent a jackbolt body having jackbolt threads to threadedly engage said body threads in one of the holes in said jackbolt body, said jackbolt threads and said body threads being constructed to form a helical gap commencing at a place of metal to metal threaded contact proximate said torque receiving end and terminating remotely thereto along the length of the jackbolt, said helical gap being defined by an ever increasing transverse volume to elastically produce metal to metal thread contact in a load transferring relation along the length of the threads with ever increasing thread stress in response to torque applied to the torque receiving end of the jackbolt.

2. A multi jack bolt tensioner according to claim 1 wherein said helical gap is formed by dissimilar thread pitches between said body threads and said jackbolt threads.

3. A multi jack bolt tensioner according to claim 1 wherein said jackbolt threads are tapered and have the largest diameter in the tapered configuration proximate the torque receiving end of the jackbolt for forming said helical gap.

4. A multi jack bolt tensioner according to claim 1 wherein said helical gap is defined by a thread flank angling between the threads comprising said body threads relative to the thread flank angling of the threads comprising said jackbolt threads, the construction of such differently angled thread flanks establishing threaded contact at a diameter less than the thread pitch diameter for reducing the torque arm radius which extends from a longitudinal axis of said jackbolt threads to the site of mating thread engagement.

5. A multi jack bolt tensioner according to claim 1 wherein each of said jackbolts includes a compression end surface opposite said torque receiving end, said compression end surface having a protruding central area along a longitudinal axis of said jackbolt for reducing bearing friction and preventing fretting under the compressive force developed in response to torquing of the jackbolt.

6. A multi jack bolt tensioner according to claim 5 wherein said protruding central area is parabolic.

7. A multi jack bolt tensioner according to claim 5 wherein said protruding central area is conical.

8. A multi jack bolt tensioner according to claim 5 wherein said protruding central area is spherical.

9. A multi jack bolt tensioner according to claim 8 wherein said sphere is defined by a radius of the order of between 5 and 20 times the diameter of said jack bolt.

10. The multi jack bolt tensioner according to claim 5 wherein said helical gap is formed by dissimilar thread pitches between said body threads and said jackbolt threads.

11. A multi jack bolt tensioner according to claim 5 wherein said jackbolt threads are tapered and have the largest diameter in the tapered configuration proximate the toque receiving end of the jackbolt for forming said helical gap.

12. A multi jack bolt tensioner according to claim 1 wherein each of said jackbolts includes a compression end surface opposite said torque receiving end, said compression end surface having two truncated concentric conical surfaces merging at a common diameter protruding central area along a longitudinal axis of said jackbolt for forming a conical lubricant storage cavity reducing bearing friction under the compressive force developed in response to applying and releasing torque to the jackbolt.

13. A multi jack bolt tensioner according to claim 1 wherein said jackbolt threads are constructed and arranged to shorten in response to thread load produced by torque applied to said torque receiving end.

14. A multi jack bolt tensioner according to claim 1 wherein said helical gap is formed by dissimilar thread pitches and by different thread flank angling between said body threads and said jackbolt threads.

15. A multi jack bolt tensioner according to claim 1 wherein said helical gap is formed by dissimilar thread pitches, tapered threads and differential thread flank angling of said body threads and said jackbolt threads.

* * * * *